April 5, 1960          C. R. BELL          2,931,965
ALTITUDE CONTROL SERVOSYSTEM INCLUDING PRESSURE SENSOR BOOSTER
Filed Dec. 10, 1953
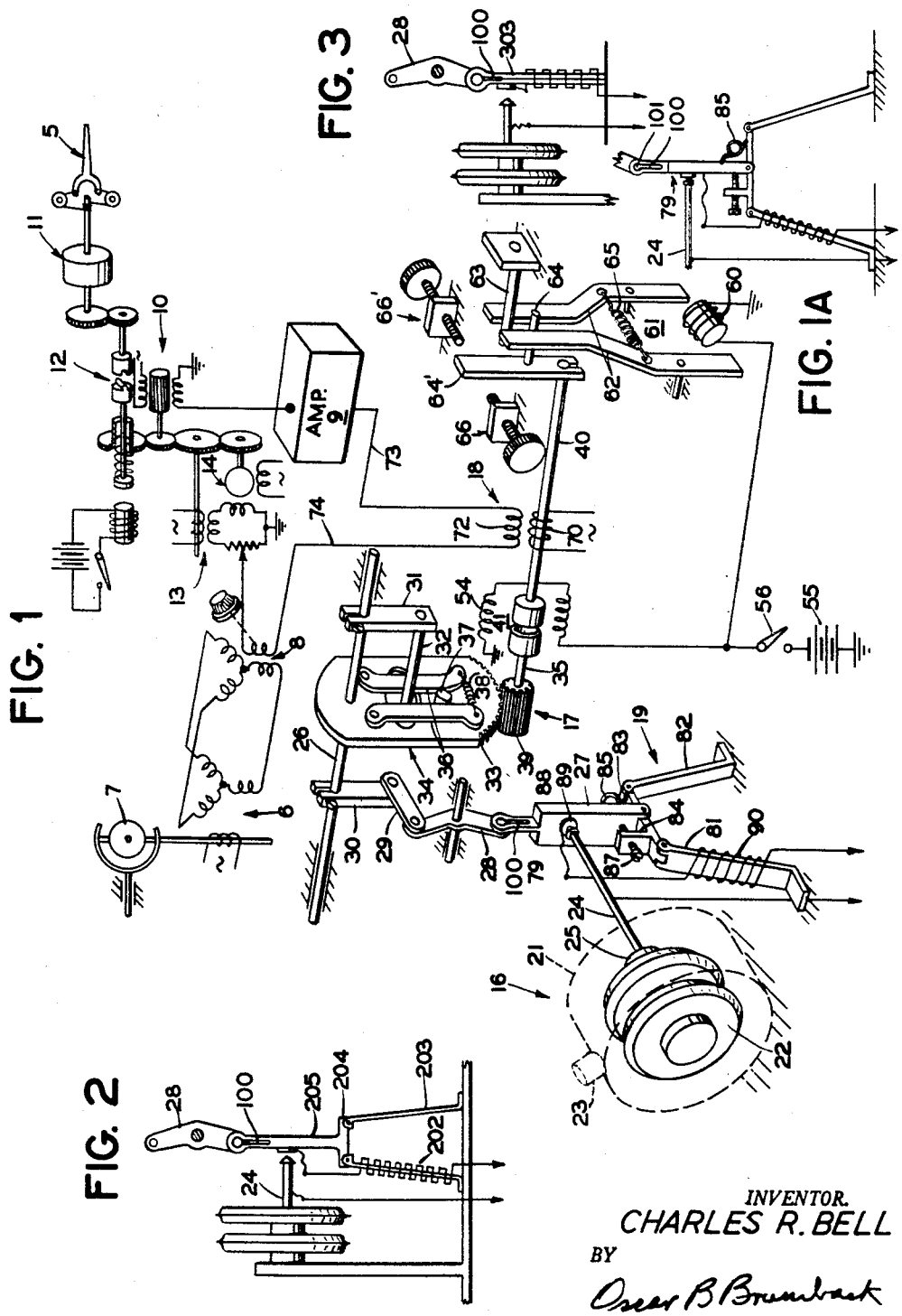
INVENTOR.
CHARLES R. BELL
BY
Oscar B Brumback
ATTORNEY United States Patent Office 2,931,965
Patented Apr. 5, 1960

2,931,965

ALTITUDE CONTROL SERVOSYSTEM INCLUDING PRESSURE SENSOR BOOSTER

Charles R. Bell, Bergenfield, N.J., assignor to Bendix Aviation Corporation, Teterboro, N.J., a corporation of Delaware Application December 10, 1953, Serial No. 397,360

16 Claims. (Cl. 318—481)

This invention relates generally to control devices and more particularly to altitude control devices.

Altitude control devices have been used heretofore with automatic pilot systems to maintain an aircraft at a predetermined altitude. These have included a unit, which in response to ambient pressure changes, would drive a relatively heavy signal developing mechanism which provided a signal for actuating the automatic pilot system, this signal corresponding to the extent of displacement of the craft from a predetermined altitude. The disadvantage present in such devices is that the force developed by the pressure responsive unit is relatively small so that little or no extra force is produced to compensate for any friction which may develop during the operating life of the mechanism due to deterioration of the motion transmissions.

An object of the present invention, therefore, is to provide a novel control device wherein the power applied to an operating mechanism is not dependent upon the force developed by a condition responsive device.

Another object is to provide a novel mechanism for boosting the force exerted on a signal generator by a sensing unit wherein the novel mechanism may include a provision for corrections for ambient temperature conditions.

A further object is to provide a novel mechanism for boosting the force which may be exerted on a signal developing device by a condition responsive device, the condition sensing device exerting an initial force on the signal generator and this force being relieved and multiplied by a boost mechanism.

The present invention contemplates a novel altitude control wherein a switch actuated by a pressure responsive unit causes a temperature sensitive element to be heated and the resulting movement of the element supplies the actuating force to a signal generator which supplies signals to a control system.

The foregoing and other objects and advantages of the invention will appear more fully hereinafter from a consideration of the detailed description which follows, taken together with the accompanying drawing wherein several embodiments of the invention are illustrated by way of example. It is to be expressly understood, however, that the drawing is for the purpose of illustration and description only, and is not intended as a definition of the limits of the invention.

In the single sheet of drawing wherein like figures designate like parts:

Fig. 1 illustrates a schematic diagram of the novel altitude control of the present invention incorporated in the pitch control channel of an automatic pilot system;

Fig. 1A is a side elevational view showing the boost device of the control illustrated in Fig. 1.

Fig. 2 illustrates another embodiment of the novel altitude control illustrated in Figure 1; and Fig. 3 illustrates a further embodiment of the novel altitude control of Figure 1.

The novel altitude control system hereof is shown as being incorporated in the elevator control channel of a conventional automatic pilot system which may be of the type more fully described in U.S. Patent No. 2,625,348, issued January 13, 1953, to Noxon et al.

In the embodiment of the automatic pilot system in Figure 1, one control effect for elevator 5 is derived from an electrical pick-off 6 on the pitch axis of an altitude gyroscope 7. When the craft is displaced from a predetermined attitude, pick-off 6 develops a signal whose magnitude and phase corresponds to the extent and direction, respectively, of the displacement. This signal is transmitted through a manually settable inductive receiver 8 to the input of a conventional vacuum tube amplifier 9 whose output energizes a two-phase induction motor 10. Through a speed reduction gearing contained within a housing 11 and a clutch 12, motor 10 moves elevator surface 5 and also actuates a conventional follow-up device 13 and rate generator 14. Follow-up device 13 and rate generator 14 develop follow-up and velocity signals, respectively, for mixing with the signal of the pick-off 6 for modifying the operation of motor 10.

Although the craft is being maintained in a desired attitude by attitude gyro 7, it may not be flying at a desired altitude because changes in various conditions such as airspeed, updrafts, or downdrafts often cause the craft to change altitude without changing attitude. Therefore, an altitude control device is also provided.

The embodiment of the novel altitude control device of the present invention as illustrated in Fig. 1 is comprised generally of a pressure responsive device 16, a motion transmission device 17, a signal developing device 18, and a boost system 19.

Pressure responsive device 16 includes an air-tight casing 21 and an aneroid 22. Casing 21 has an opening 23 for exposing aneroid 22 to the atmosphere and an opening for an arm 24 which is secured to aneroid 22. A boot 25 maintains an air-tight seal about the arm. Thus, the effect of changes in static pressure due to changes in altitude is impressed on aneroid 22.

Aneroid 22 may be conventional, having diaphragms superimposed upon each other in a fixed relation. The lower diaphragm is secured to casing 21, and the upper diaphragm is secured to arm 24. Thus, the contraction and expansion of aneroid 22, correspondingly moves arm 24.

The movement of aneroid 22 also rotates a shaft 26. In order that the reciprocal movement of arm 24 may rotate shaft 26, this arm connects with the shaft by way of an arm 27, a bell crank lever 28, and connecting links 29 and 30. In this manner, the reciprocal movement of arm 24 oscillates shaft 26, and shaft 26 through an arm 31 and a pin 32 rotates the sector 33 of an overload device 34 to rotate another shaft 35. As indicated the connection between arm 27 and lever 28 includes slot 100 on an extension of the arm 27 and a pin 101 on lever 28 slideable in the slot whereby no vertical motion of arm 27 is transmitted to the shaft 26.

Sector 33 is rotatable on shaft 26 and is indirectly actuated by shaft 26. To this end, a pair of levers 36 are pivotally mounted on sector 33. These levers straddle pins 32 and 37 and are urged together by a spring 38. As movement of arm 31 through pin 32 displaces a lever 36 in one direction, pin 37 holds the other lever. Spring 38 urges sector 33 to follow the displacement of the lever; but if the sector be restrained, the spring yields to permit a continued displacement of pin 32. Sector 33 meshes with a gear 39 whose shaft 35 may be connected to a coaxial shaft 40 by way of a magnetic clutch 41.

One face of magnetic clutch 41 is attached by a resilient member to a disc on shaft 35 and the other face is fixed to shaft 40. These clutch faces are surrounded by a coil 54 which, when energized from a battery 55 by the closing of a switch 56, urges the one clutch face outwardly relative to its shaft 35 and into engagement with the other clutch face. Thereafter, any motion of shaft 35 is transmitted to shaft 40.

Energizing coil 54 of magnetic clutch 41 also energizes the solenoid 60 of a centering device 61 which is provided to urge shaft 40 to a predetermined position when clutch 41 is not engaged. In this centering device, a pair of levers 62 straddle pins 63 and 64, and are urged to a position in engagement with pins 63 and 64 by a spring 65. Pin 63 is fixed, and pin 64 projects from an arm 64' of shaft 40. When solenoid 60 is energized, the upper portion of levers 62 are separated so as not to place the load of spring 65 on shaft 40. Stops 66 and 66' limit the maximum angular displacement of arm 64'.

The purpose of centering device 61 is to keep the rotor winding 70 of an inductive signal developing device 18 at a null position relative to its stator winding 72 when clutch 41 is disengaged. Rotor winding 70 is supported on shaft 40, and stator winding 72 is fixed. One end of stator winding 72 is connected by a lead 73 to the input of amplifier 9, and the other end is connected by a lead 74 to the stator winding of inductive device 8 to receive the follow-up, rate, and pitch signals.

Considering the operation of the structure so far described, as the aircraft ascends, aneroid 22 expands and moves shaft 24 forwardly. Through linkages 27, 28, 29 and 30, this linear motion angularly rotates shaft 26 which, in turn, rotates the sector 33 of overload device 34. Sector 33 through gear 39 rotates shaft 35. However, switch 56 is open at this time so clutch 41 is not engaged and the motion of shaft 35 is not transmitted to shaft 40. Centering device 61 keeps rotor winding 70 at its null position relative to stator winding 72.

As soon as the craft reaches the desired altitude and is trimmed for level flight, switch 56 is moved to a closed position to energize coil 54 and solenoid 60. Coil 54 engages the faces of clutch 41 so that any subsequent motion of shaft 35 is transmitted to shaft 40. Solenoid 60 pulls the lower arms of centering lever 42 together so that the load of spring 65 will not be impressed on the altitude sensing unit.

Should the aircraft for some reason be displaced upwardly from the predetermined altitude, the change in barometric pressure causes aneroid 22 to expand thrusting arm 24 outwardly which through bell crank lever 28 and links 29 and 30 rotates shaft 26. The rotation of arm 31 turns sector 33, thereby rotating gear 39 so that, by way of shaft 35 and 40, rotor winding 70 is displaced relative to stator winding 72. The resulting signal from stator winding 72, after amplification in amplifier 9, drives motor 10 until elevator surface 5 is displaced to correct for the displacement of the craft from the altitude at which the faces of clutch 41 were engaged.

Although the altitude control thus far described works well, it is subject to the disadvantage that the force developed by the pressure responsive unit is limited and the force required to operate the signal generating device and motion transmission may increase as the normal wear of the parts progress. In accordance with the present invention, the force necessary to move the signal developing device is generated in a novel boost system and may be either independent of the force developed by the pressure sensing unit or provide an additional force to relieve the force required of the pressure sensitive unit.

In the embodiment shown in Figure 1, any force exerted by arm 24 against arm 27 is relieved and enhanced by the novel boost arrangement 19. This boost arrangement is comprised of a contact switch 79, two temperature sensitive arms 81 and 82 forming the legs for a cross piece 83, an arm 84 pivoted by the cross piece, a spring 85 connected to arm 27 and the cross piece 83 for urging arm 27 into engagement with arm 24, and an adjusting screw 87.

Switch 79 is comprised of two contacts 88 and 89. Contact 88 is fixed to arm 24 but insulated therefrom, and cooperating contact 89 is fixed to arm 27. Connected to contact 89 in a heating element 90 fixed to leg 81. Thus, when contact 88 engages contact 89, a closed circuit exists for heater 90.

Legs 81 and 82 may be formed of suitable temperature sensitive material whose length changes with temperature. As long as contacts 88 and 89 are closed, the heat generated in heater 90 causes leg 81 to increase in length thereby tilting cross piece 83. When the leg has moved enough for adjusting screw 87 to engage arm 27, any further movement moves arm 27 through bell crank lever 28 and connecting links 29 and 30, rotates shaft 26.

Also when arm 27 moves away from shaft 24, contacts 88 and 89 open. This interrupts the supply of energy to heater 90. As leg 81 cools, cross piece 83 moves back toward level position. Spring 85 constrains arm 27 to move toward arm 24, and contacts 88 and 89 again engage.

The net result of the engagement and disengagement of contacts 88 and 89 is that an equilibrium condition becomes established where the average dissipation of heat from the sensitive element 81 equals the input thereto. At this position, contacts 88 and 89 intermittently engage and substantially no force is required of aneroid 22.

The ambient temperature may change as the craft moves from one altitude to another. Thus, the second leg 82 is also made of temperature sensitive material so that it will move with change in ambient temperature. Thus, the relative angular position of cross piece 83 does not change, and a continuous and automatic temperature correction is provided.

The operation of the novel altitude control device with the boost illustrated in Figure 1 is as follows. Should the aircraft for some reason ascend after clutch 41 has been engaged, a corresponding forward movement of arm 24 resulting from the expansion of aneroid 22 will engage contacts 88 and 89 and will pivot arm 27 on cross piece 85. This moves bell crank lever 28 and rotates shaft 26 which, through overload device 34 and shafts 35 and 40, will displace rotor 70 of inductive device 18 to develop a signal in stator 72. This signal applied to the signal chain of the automatic pilot system will operate servomotor 10 to displace elevator surface 5 to correct for altitude deviation.

Upon the engagement of contacts 88 and 89, heater 90 will be energized. As this heater generates heat, leg 81 will increase in length and the resulting tilting of cross piece 83 will engage screw 87 with arm 27. Any further heating of leg 81 will cause arm 27 to move away from arm 24 and disengage contacts 88 and 89. This deenergizes heater 90. Immediately, leg 81 begins to cool and shorten. As cross piece 83 begins to return to level, spring 85 constrains arm 27 to follow. Thus, as the craft returns to the predetermined altitude level because of the displaced surface, arm 24 moves to the right in Figure 1 and arm 27 follows.

Leg 82 may also be of temperature sensitive material. Thus, as the ambient temperature changes, the lengths of legs 81 and 82 change correspondingly so that the relative angle of cross piece 83 with respect to the legs does not change with the ambient temperature.

In the embodiment shown in Figure 1, the aneroid, itself, through arm 24 exerts an initial pressure against arm 27 and the pressure is relieved as leg 81 is heated. This gives a rapid response of the unit. The amount of this initial pressure is governed by the tension of spring 85 and the adjustment of screw 87.

Fig. 2 illustrates an embodiment of the novel boost control in which the force applied to the bell crank arm 27 for the signal generator is independent of the force applied by arm 24. In this embodiment, two temperature sensitive legs 202 and 203 are employed to support cross piece 204 to which an arm 205 engaging bell crank lever 28 is fixed. Thus as cross piece 204 tilts due to the expansion or contraction of leg 202, arm 205 moves bell crank lever 28. Leg 203 may also be of temperature sensitive material to correct for ambient temperature changes.

Fig. 3 illustrates another embodiment in which a single temperature sensitive element 303 is fixed to a support and connected to bell crank lever 28. Element 303 may be a conventional bimetallic element which bows to an extent corresponding to its temperature. This movement will actuate bell crank lever 28 and develop a signal in inductive device.

The foregoing describes a novel altitude control wherein the force applied to the moving parts of a signal generator may be independent of the forces developed by the condition sensing device. The novel altitude control described may either directly actuate a signal generator and have the force exerted by the pressure sensitive element replaced and boosted or the boost control, itself, may exert the force necessary to move the signal generator. Provision is also made in the novel boost system to compensate for changes in ambient temperature conditions.

Although only several embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In an automatic steering system for an aircraft, a servomotor adapted for moving a pitch control surface of said craft, signal developing means operatively connected with said servomotor for developing control effects for operating the servomotor, pressure responsive means movable in response to changes in altitude of said craft, and force boosting means having a temperature sensitive element adapted for engagement with said pressure responsive means and connected with said signal developing means, said temperature sensitive element operating the signal developing means by a force independent of said pressure responsive means when engaged by the movement of the latter.

2. In combination, a signal developing means, pressure responsive means movable in response to changes in altitude, and force boosting means adapted to be operatively connected with said pressure responsive means and said signal developing means for operating the latter in responsive to movement of the former said force boosting means including a temperature sensitive element for supplying a force for operating said signal means when an operative connection is made between said pressure responsive means and said boosting means.

3. An altitude controller comprising altitude responsive means, signal developing means, and boost means interposed between said altitude responsive means and said signal developing means for actuating the latter in response to the former by a force independent of forces developed by said altitude responsive means, said boost means including thermally responsive means for supplying said independent force.

4. In an automatic steering system for an aircraft, a servomotor adapted for moving a pitch control surface of said craft, altitude responsive means, signal developing means, power boost means interposed between said altitude responsive means and said signal developing means including thermally responsive means operable by said altitude responsive means for actuating the signal developing means in response to the altitude responsive means by a force independently of the force developed by said altitude responsive means, and means connecting said signal developing means and said servomotor for actuating the latter from the signals of the former.

5. An altitude controller comprising means movable in response to changes in altitude, a two part signal developing means having one part movable relative to the other to develop an electrical control signal, the force exerted by the movement of said altitude responsive means being limited and said signal developing means being subject to wear during operation so that more force is required to move said one part, and boost means interposed between said signal developing means and said altitude responsive means for operating the latter by a force that is independent of the force developed by said altitude responsive means.

6. An altitude controller comprising signal developing means, means responsive to temperature operatively connected to said signal developing means for actuating the latter, heating means for said temperature responsive means, switch means connected to a source of current for energizing said heating means when said switch means is operative, and means responsive to change in altitude for operating said switch means to actuate said signal developing means by a force independent of the altitude responsive means.

7. An altitude controller comprising a two part signal developing device having one part movable relative to the other to develop a signal, motion transmission means connected to said one part, temperature sensitive means having one end fixed and the other end connected to said transmission, said temperature sensitive means expanding when heated and contracting when cooled, electrical current conducting means adapted to heat said temperature sensitive means whereby its expansion will operate said transmission, switching means connected to a source of current and adapted to energize said current conducting member, and means responsive to change in altitude for actuating said switching means.

8. An altitude control device comprising a member movable in response to changes in altitude, a signal generator having a part movable to develop a signal, a member operatively connected to said part and movable in response to changes in temperature, switch means having two contacts, one contact being carried by said pressure responsive member, the other contact being carried by said temperature responsive member, a source of energy connected to said one contact, heating means for said temperature responsive member being connected to the other contact whereby said heating means generates heat upon engagement of said contacts so that said temperature responsive member moves to disengage said contacts and to move said one part of said signal generator to develop a signal therein.

9. An altitude controller comprising means having an arm movable in response to changes in barometric pressure, signal developing means having a part movable to develop a signal, a bimetallic member operatively connected to said part, switch means having two contacts, one of which is carried by said arm and the other by said bimetallic member, a source of electrical energy connected to said one part, and heating means connected to said other contact and surrounding said bimetallic member to heat the latter and vary the position of the contact carried thereby and move said part of the signal generator to develop a signal.

10. An altitude controller comprising a member movable in response to changes in barometric pressure, a two part signal generator having one part movable to develop an electrical signal, means interconnecting said signal generator and said pressure responsive member for moving the latter by the former to develop a corresponding signal, said last-named means including means for relieving the force required of said barometric pressure responsive member to move said part of said signal generator.

11. An altitude controller comprising a member movable in response to changes in barometric pressure, a two part signal generator having one part movable to develop a signal, means interconnecting said signal generator and said pressure responsive member for moving the latter by force exerted by the former to develop a corresponding electrical signal, said last-named means including boost means for relieving the force required of said barometric pressure responsive member to move said part of said signal generator by exerting an independent force and means for correcting the operation of said last named means for changes in ambient temperature.

12. A controller comprising a member movable in response to changes in ambient pressure, means actuable to develop a signal, means engageable with said member and operatively connected with said signal developing means for actuating the latter by the former and thermally responsive means becoming heated upon engagement of said member and said last-named means for moving the latter out of engagement with said member.

13. A controller comprising a member movable in response to changes in ambient pressure, means actuable to develop a signal, means engageable with said member and operatively connected with said signal developing means for actuating the latter by the former and further means becoming operative upon engagement of said member and said last-named means for moving the latter out of engagement with said member, said further means including a temperature sensitive element, and means for heating said element upon said engagement.

14. A controller comprising a member movable in response to changes in ambient pressure, means actuable to develop a signal, means engageable with said member and operatively connected with said signal developing means for actuating the latter by the former and further means becoming operative upon engagement of said member and said last-named means for moving the latter out of engagement with said member, said further means including means for compensating for ambient temperature effects, a temperature sensitive element, and means for heating said element upon said engagement.

15. An altitude controller comprising a member movable in response to changes in altitude, means actuable to develop a signal, means engageable with said member and operably connected with said signal developing means for actuating the latter, and further means becoming operative upon the engagement of said member and said last-named means for moving the latter out of engagement with the former, said further means including two temperature sensitive legs, a cross piece connecting said legs, a heater for one of said legs, and means for actuating said heater upon engagement of said member and said last-named means whereby the relative dimensions of said legs change and the movement of said cross piece causes the disengagement of said member and last-named means.

16. An altitude controller comprising a pair of legs one of which is temperature responsive, a cross bar connecting said legs, means actuable for producing a signal, a member projecting from said cross bar for actuating said signal producing means, a member movable in response to changes in altitude and engageable with said projecting member, and a heating element for said temperature responsive leg, and means for operating said heater upon engagement of said projecting and movable members, whereby the engagement of said members operates said heater so that said temperature responsive leg moves said cross bar to disengage said members and actuate said signal developing means.

References Cited in the file of this patent

UNITED STATES PATENTS

| | | |
|---|---|---|
| 1,289,617 | Berry | Dec. 31, 1918 |
| 2,358,803 | Hanson | Sept. 26, 1944 |
| 2,446,546 | Meston | Aug. 10, 1948 |
| 2,512,902 | Rossire | June 27, 1950 |
| 2,567,831 | Turner | Sept. 11, 1951 |
| 2,798,191 | Brailsford | July 2, 1957 |

UNITED STATES PATENT OFFICE
CERTIFICATE OF CORRECTION

Patent No. 2,931,965                    April 5, 1960

Charles R. Bell

It is hereby certified that error appears in the printed specification of the above numbered patent requiring correction and that the said Letters Patent should read as corrected below.

Column 2, line 7, for "altitude" read -- attitude --; column 5, line 52, for "responsive to movement of the former" read -- response to movement of the former, --; column 6, lines 11 and 12, strike out "signal developing means and said altitude responsive" and insert instead -- altitude responsive means and said signal developing --; line 47, strike out "being"; line 68, before "means" insert -- and --; line 69, for "signal generator and said pressure responsive member" read -- pressure responsive member and said signal generator --; column 7, lines 3 and 4, strike out "signal generator and said pressure responsive member" and insert instead -- pressure responsive member and said signal generator --; line 10, after "force" insert a comma; lines 16, 24 and 34, after "former", each occurrence, insert a comma.

Signed and sealed this 18th day of April 1961.

(SEAL)
Attest:

ERNEST W. SWIDER
Attesting Officer

DAVID L. LADD
Commissioner of Patents